M. Hanford,

Elevator.

No. 99,433.    Patented Feb. 1, 1870.

Witnesses
Daniel T. Robinson
Edward Griffith

M. Hanford.
by his Attorney
Frederick Curtis.

United States Patent Office.

MELANCTHON HANFORD, OF BOSTON, MASSACHUSETTS.

Letters Patent No. 99,433, dated February 1, 1870.

IMPROVED ELEVATOR.

The Schedule referred to in these Letters Patent and making part of the same.

*To all to whom these presents shall come:*

Be it known that I, MELANCTHON HANFORD, of Boston, in the county of Suffolk, and Commonwealth of Massachusetts, have made an invention of a new and useful Elevator for hoisting goods or articles of various kinds; and do hereby declare the following to be a full, clear, and exact description thereof, due reference being had to the accompanying drawings, making part of this specification, and in which—

Figure 1:
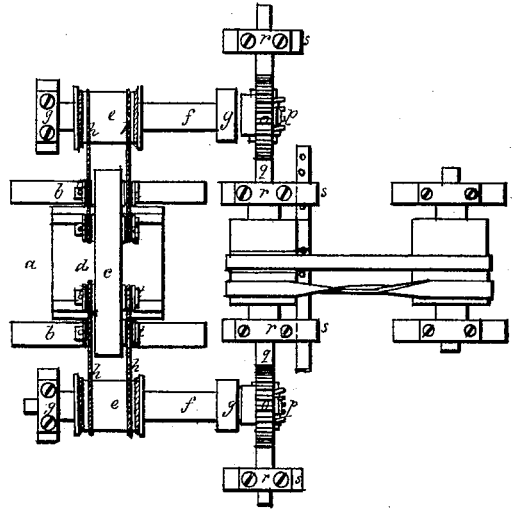
Figure 1 is a plan.
Figure 2:
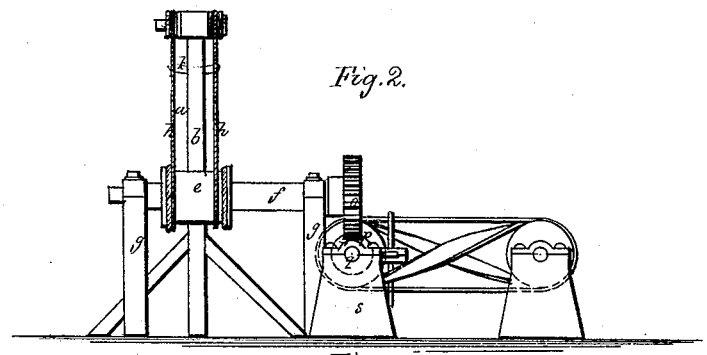
Figures 2 and 3 are side elevations of my invention.
Figure 3:
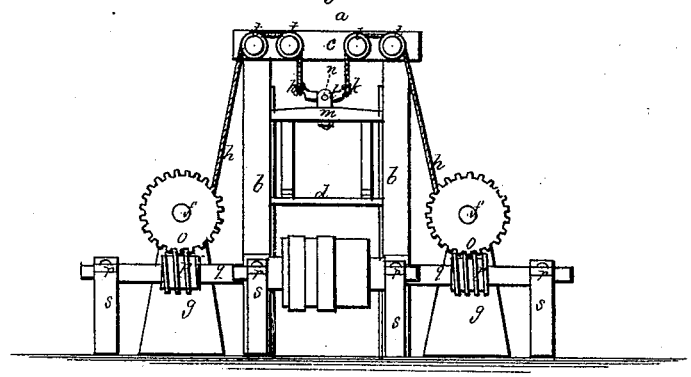

The invention embraced in this description, and comprising the subject-matter of this patent, relates to a class of elevators for buildings, in which the hoisting agency is one or more ropes, wound upon a drum, and connected with the elevator-carriage, in a suitable manner.

One object sought, in bringing out this invention, is to reduce the end-thrust or strain, brought upon the main driving-shaft, which actuates the drum or drums, by the weight of the elevator-carriage and its load, as well as to equalize the strain and tension exerted upon the different points of the device, both being accomplished by the employment of two drums, or sets of drums, driven by right and left worms, such worms being mounted upon a shaft, and driven by a pulley and belts, the whole being as hereinafter explained.

In the drawings above referred to as accompanying this specification and which illustrate my invention—

$a$ denotes an upright frame, composed of two side-posts or guides $b$ $b$, and a transverse bar or head, $c$, the former serving as guides to the hoisting-carriage or platform, shown at $d$, these parts being constructed and disposed after the manner of many elevators now in use.

In carrying out my invention, I dispose, preferably, upon opposite sides of the frame $a$, two revolving drums $e$ $e$, which are mounted upon shafts $f$ $f$, supported in suitable standards $g$ $g$, two hoisting-ropes, $h$ $h$, being confined, at one end, to each drum, and having their opposite ends carried about suitable rollers $t$ $t$ $t$, &c., and secured to opposite ends of one of two lateral bars $k$ $k$, such bars, at their centres, being swivelled to an oscillating cross-head, $l$, pivoted, at its centre, to the central line of draught of the upper cross-bar $m$, of the carriage $d$, as shown at $n$.

To the inner extremity of each shaft $f$, and in front of its standard, I affix a worm-gear, $o$, while below each worm-gear, and meshing into it, I dispose a revolving worm, $p$, the two worms $p$ being, in turn, mounted upon a long horizontal shaft, $q$, the ends of such shaft being mounted and revolving in boxes $r$ $r$, suitably fixed to standards $s$ $s$, erected in the immediate vicinity of the standard $g'$, and so that the shaft $q$ shall stand at right angles to the shafts $f$ $f$, it being observed that the worms are right and left worms, by which means the gears and drums are rotated in opposite directions.

The shaft $q$ is to be provided with reversible fast pulleys, and a loose pulley and belts, in manner well understood by mechanics, by which the direction of rotation of the shaft may be reversed, and the elevator-carriage raised or lowered, or its movements arresaed at pleasure.

The revolution of the shaft, by means of its worms, as will be at once understood, will revolve the gears $p$ $p$, and, by winding the ropes upon the drums, elevate or lower the carriage, as the case may be, according to the direction in which they travel.

The arrangement of the right and left worms, taken, of course, in connection with the hoisting-drums and their gears, secure the following important advantages:

One advantage of such dually-arranged worms and gears, in addition to the increased bearing-surface of screw-threads and gear-teeth, obtained, will be seen in the additional means of safety they afford, since, if one of such worms or gears should fail, its fellow will be left to perform, to a certain extent, the duty of both, and to effectually prevent accident.

As the strain and power necessary to elevate the load are distributed between two worms, the wear upon each is reduced, in comparison with the employment of one, while, as the strain exerted upon them, whether from the weight of the load, in one direction, or the power applied to the shaft, in the other direction, is exerted in contrary directions, and with equal force upon each, this strain is transferred from the shaft and its bearings to the worms, with obvious advantages in economy of wear upon the former.

By the act of equalizing the strain and pressure upon the elevator-carriage and its frame, by the arrangement of the duplicate drums, and right and left worms, I reduce the amount of power required to drive the same.

The arrangement of the lateral bars $k$ $k$, and the oscillating head $l$, also equalize and distribute the direct strain and action of the hoisting ropes upon the carriage.

Claims.

1. In an elevator for hoisting merchandise, &c, the employment of two hoisting-drums, or sets of drums, with one or more ropes, or their equivalents, for each drum, combined with right and left driving-worms, and intermediate gears, for the purpose and substantially under the general disposition herein shown and explained.

2. The general arrangement and combination of the carriage $d$, and its frame, the drums $e$ $e$, mounted, and provided with the gears $o$ $o$, as explained, and the worms $p$ $p$, mounted upon the shaft $q$, the latter being provided with reversible fast pulleys, and with a loose pulley and belts, and the whole arranged and operating as hereinbefore set forth.

Witnesses:     MELANCTHON HANFORD.
  FRED. CURTIS,
  EDWARD GRIFFITH.